(12) United States Patent
Berstis

(10) Patent No.: US 6,570,870 B1
(45) Date of Patent: May 27, 2003

(54) METHOD AND SYSTEM FOR MAKING A CHARGED TELEPHONE CALL DURING AN INTERNET BROWSING SESSION

(75) Inventor: Viktors Berstis, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/239,242

(22) Filed: Jan. 28, 1999

(51) Int. Cl.[7] ................................ H04L 12/66
(52) U.S. Cl. ............................ 370/352; 370/356
(58) Field of Search .................... 370/351, 352, 370/353, 354, 355, 356; 570/466, 400, 401; 379/201, 212, 204, 215, 205, 206, 88.17, 93.01; 709/227, 206, 249

(56) References Cited

U.S. PATENT DOCUMENTS 6,240,166 B1 * 5/2001 Collin ..................... 379/93.08
6,310,873 B1 * 10/2001 Rainis ..................... 370/356
6,337,858 B1 * 1/2002 Petty ....................... 370/356
6,430,282 B1 * 8/2002 Bannister ............... 379/211.02

* cited by examiner

*Primary Examiner*—David Vincent
*Assistant Examiner*—Ricardo M. Pizarro
(74) *Attorney, Agent, or Firm*—Duke W. Yee; Jeffrey S. LaBaw; Stephen R. Tkacs

(57) ABSTRACT

A calling service is provided within a conventional Internet operating environment wherein client machines connect to the Internet via an Internet service provider (ISP). The ISP provides Internet access to the users for a time-based or usage-based service fee. According to the invention, a client machine user is provided an option to make a telephone call to a Web site operator during a browsing session. The charges for the telephone call preferably are invoiced by the ISP (or some third party on the ISP's behalf). Thus, when a user elects to make a "one-click" telephone call to the Web site, the charge for the call preferably shows up on the user's ISP billing statement.

20 Claims, 3 Drawing Sheets

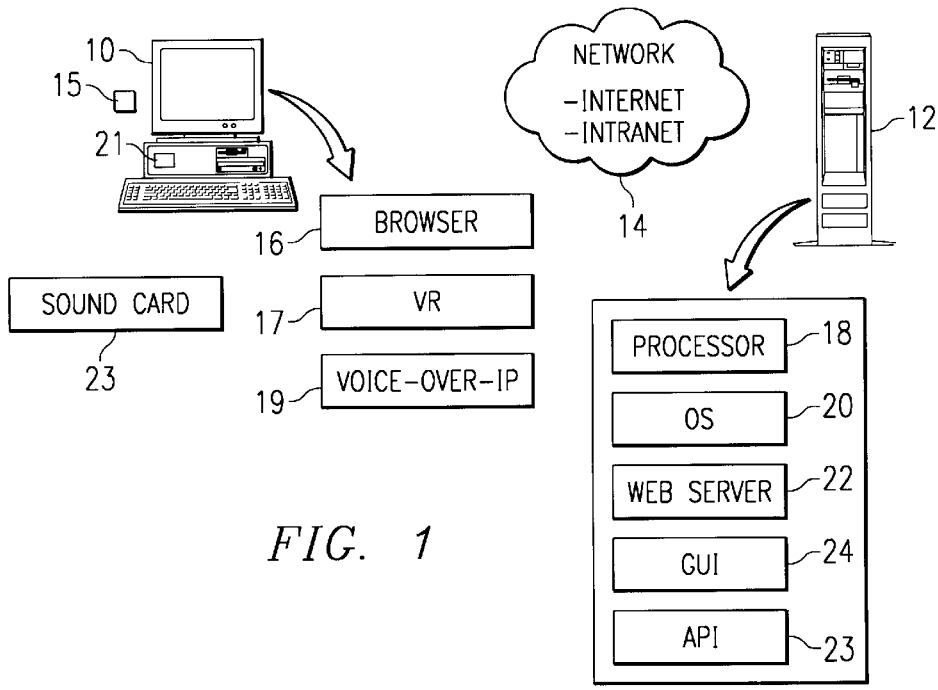
FIG. 1
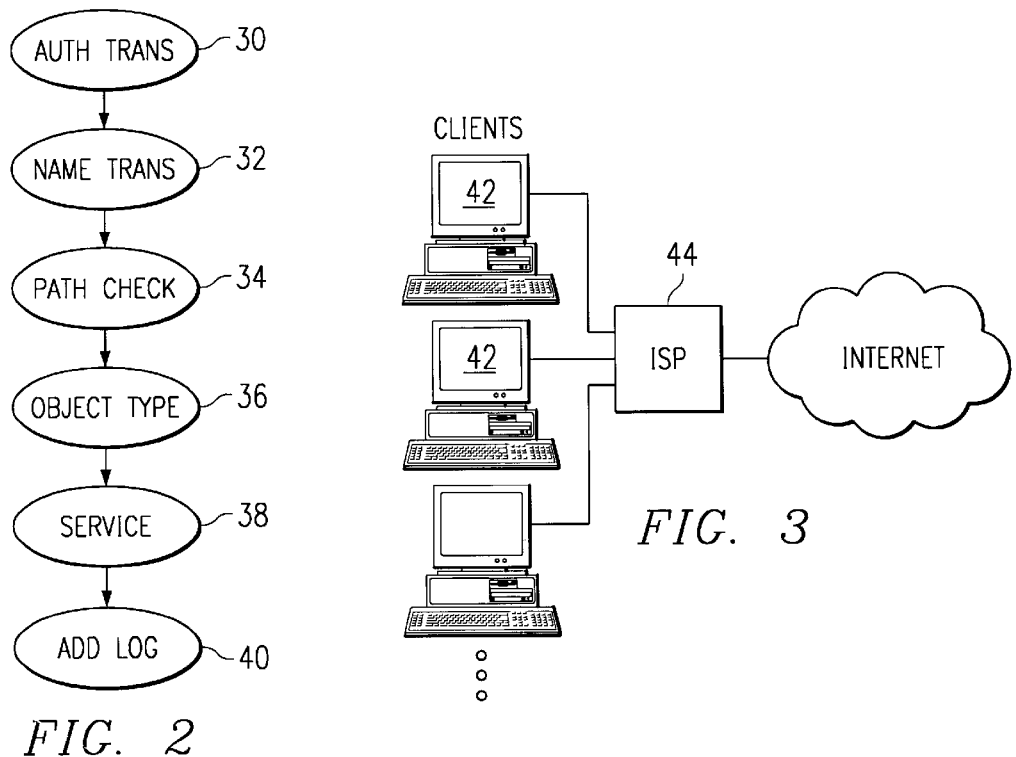
FIG. 2
FIG. 3

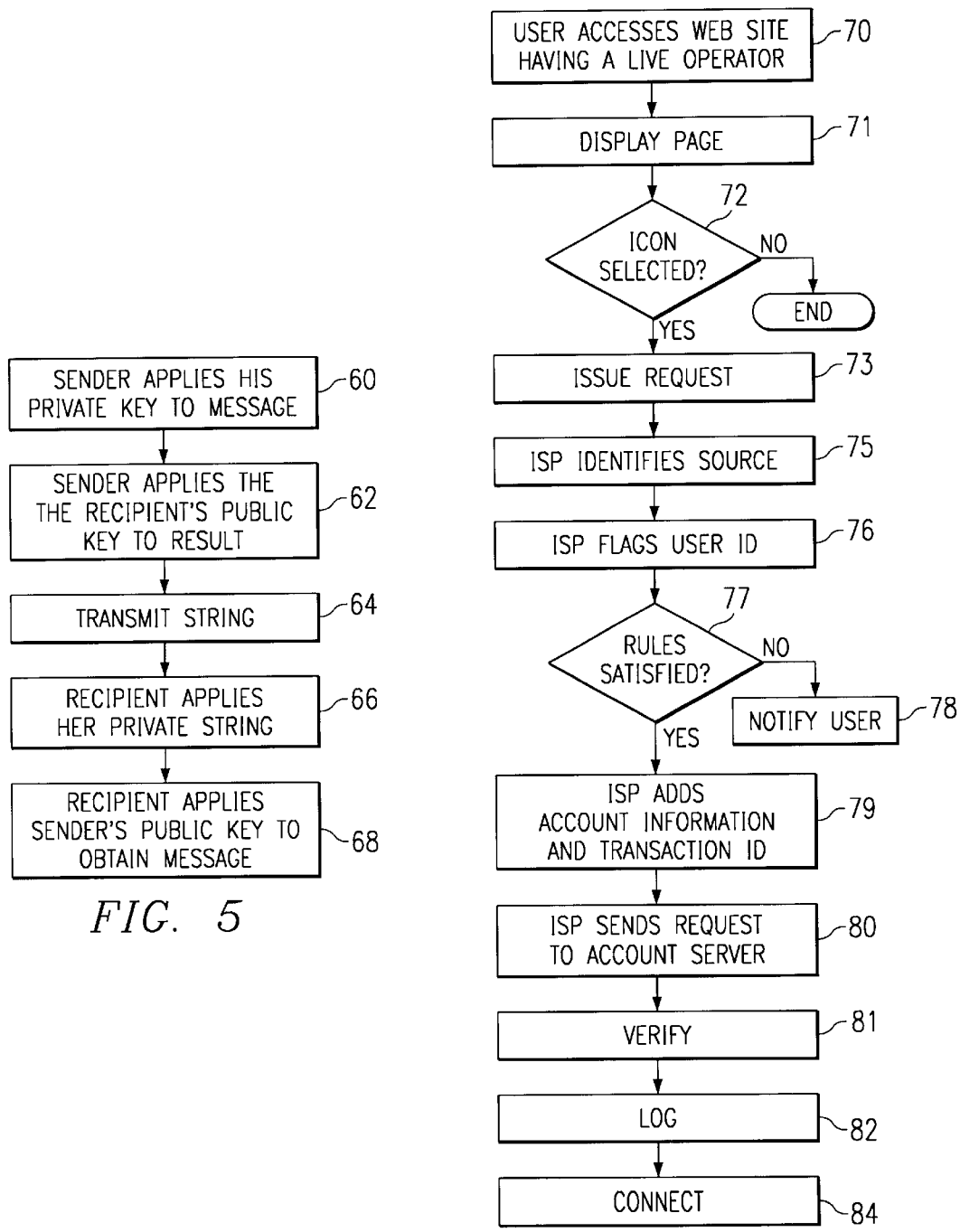

METHOD AND SYSTEM FOR MAKING A CHARGED TELEPHONE CALL DURING AN INTERNET BROWSING SESSION

BACKGROUND OF THE INVENTION

1. Technical Field

This invention relates generally to information retrieval in a computer network. More particularly, the invention relates to a method and system for enabling a computer user to effect a telephone call during an Internet browsing session without first terminating the session.

2. Description of the Related Art

The World Wide Web is the Internet's multimedia information retrieval system. In the Web environment; client machines effect transactions to Web servers using the Hypertext Transfer Protocol (HTTP), which is a known application protocol providing-users access to files (e.g., text, graphics, images, sound, video, etc.) using a standard page description language known as Hypertext Markup Language (HTML). HTML provides basic document formatting and allows the developer to specify "links" to other servers and files. In the Internet paradigm, a network path to a server is identified by a so-called Uniform Resource Locator (URL) having a special syntax for defining a network connection. Use of an HTML-compatible browser (e.g., Netscape Navigator or Microsoft Internet Explorer) at a client machine involves specification of a link via the URL. In response, the client makes a request to the server (sometimes referred to as a "Web site") identified in the link and, in return, receives in return a document or other object formatted according to HTML.

Electronic commerce over the Internet is exhibiting explosive growth. Indeed, even relatively small Web sites now enable users to purchase goods and services online, e.g., by receiving user credit card information and interfacing to online payment, distribution and tracking systems. During a browsing session, however, a user may have questions about a product, a given order, the transaction terms, or the like. While most sites provide e-mail or CGI form interactivity between the client user and the Web site, there is no convenient way for a user to speak with an live operator about the transaction (assuming such support is available from the site) unless the user has a separate dedicated telephone line or a special voice over data modem. In the latter case, there must also be a corresponding modem at the Web site. Where an additional telephone line or such special equipment is unavailable, the user has no choice other than to break the Internet connection if he or she desires to contact the site directly to call a voice telephone number (e.g. identified on a Web page).

The present invention addresses this problem.

SUMMARY OF THE INVENTION

An object of this invention is to enable a user of a Web browser to place a telephone call to a Web site operator without first terminating the user's Internet connection to the site. Preferably, the user is charged for the service by applying the cost of the call to the user's Internet service provider account.

A Web site that offers on-site operator interactivity may provide an indication, e.g., a telephone icon, to this effect on its Web page. During a browsing session at the site, the user activates the service by clicking on the telephone icon, which action initiates a telephone call to the site without disconnecting the user from his or her Internet session. The call is preferably an voice-over-IP telephony call that gets charged to the user, preferably by adding a call charge to the user's ISP account. If the Web site (or its associated live operator) cannot receive voice-over-IP telephony calls directly, the service is provided by an intermediate server that translates the IP-telephony call into a normal voice call, preferably at a point as close as possible to the called party.

Thus, the present invention enables a user to make a telephone call to a Web site during an Internet browsing session without using a separate telephone line or dedicated voice-over-data equipment. The inventive scheme provides enhanced online transaction processing. The inventive method, system and service preferably take advantage of a convenient Internet charging scheme wherein relatively small value, yet repetitive transactions are processed without user credit card entry or validation.

These and other objects of the invention are preferably implemented in a novel Web transaction processing service. The service is provided within a conventional Internet operating environment wherein client machines connect to the Internet via an Internet service provider (ISP). As is well-known, an Internet service provider provides Internet access to the users for a time-based or usage-based service fee. According to the invention, a client machine user is provided an option to make a telephone call to a Web site operator during a browsing session. The charges for the telephone call preferably are invoiced by the ISP (or some third party on the ISP's behalf). Thus, when a user elects to make a "one-click" telephone call to the Web site according to the invention, the charge for the call preferably shows up on the user's ISP billing statement. This service obviates conventional telephone call charging, e.g., local access charges, long distance charges, telephone credit or debit cards, enhanced operator service charges, 900+calls, and the like. The service also promotes and encourages users to effect telephone calls to site operators during online transactions in a seamless, efficient manner.

In accordance with one embodiment, the invention is a method of enabling a user that obtains Internet service from a service provider to initiate a telephone call to a Web site during an on-line session without terminating the user's Internet connection. The user typically has an account with the service provider to facilitate billing for his or her Internet service. According to the invention, the user is connected to a Web site that has a live operator associated therewith. During the browsing session, the user clicks on an icon on the Web page to request live help. Control routines on the client machine then initiate a voice-over-IP telephone call to the site. The call is then charged to the user's service provider account.

In the preferred embodiment, communications between the Internet service provider and the client and/or the Web site relating to the charging for the transaction are secured in an encrypted manner using a messaging protocol.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which:

FIG. 1 is a representative system in which the present invention is implemented;

FIG. 2 is a flowchart illustrating the conventional processing associated with an HTTP request from the Web client to the Web server shown in FIG. 1;

FIG. 3 is a simplified block diagram of an ISP architecture in which the present invention is implemented;

FIG. 5 is a flowchart of a public key cryptosystem; and

FIG. 6 is a flowchart illustrating a preferred operation of the 900-type charged call service of the present invention.

DETAILED DESCRIPTION OF THE PREFERRED EMBODIMENT

Figure 4:
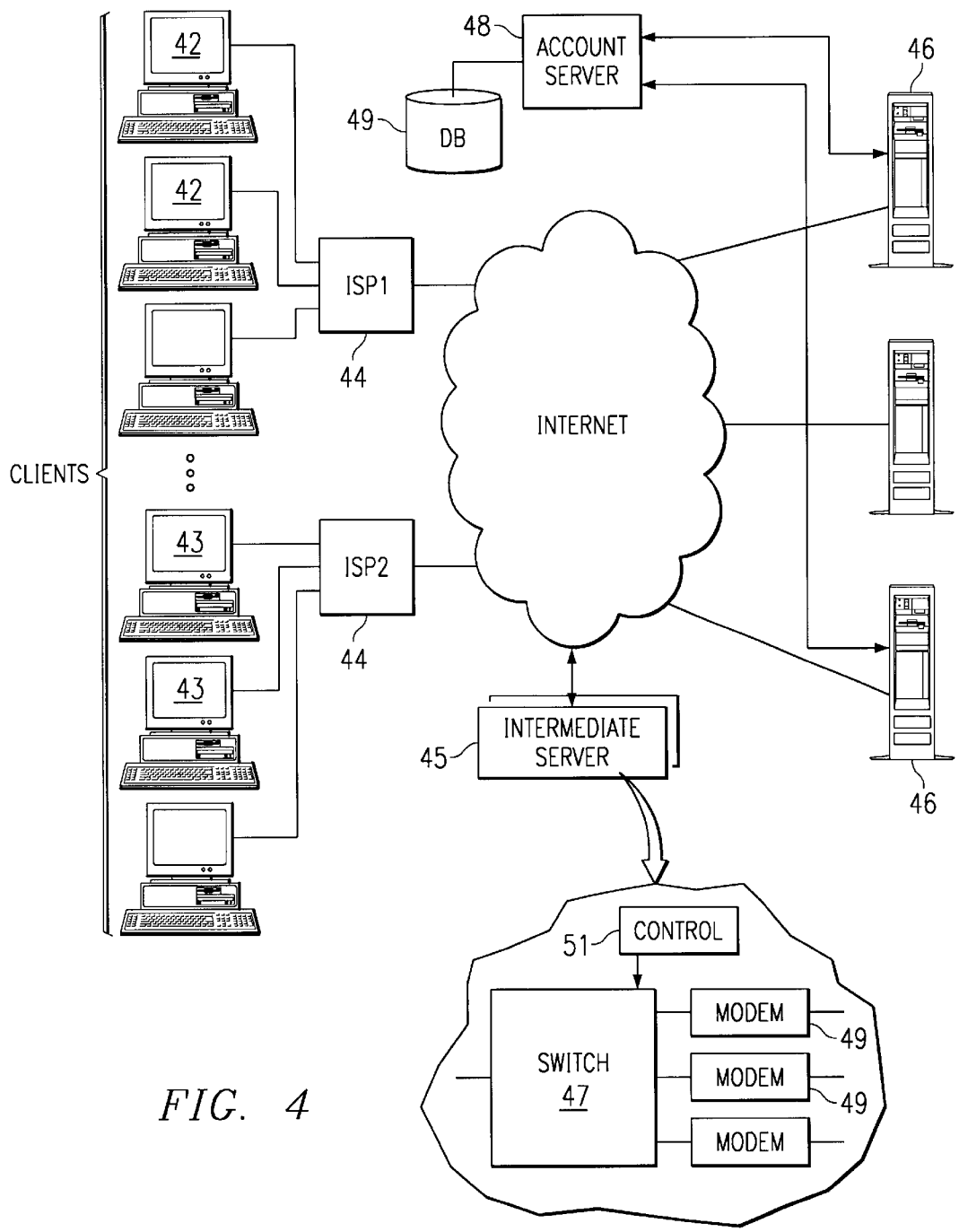
FIG. 4 is a simplified block diagram of a transaction processing system provisioned according to the present invention.

A known Internet client-server system is implemented is illustrated in FIG. 1. A client machine 10 is connected to a Web server 12 via network 14. For illustrative purposes, network 14 is the Internet, an intranet, an extranet or any other known network. Web server 12 is one of a plurality of servers which are accessible by clients, one of which is illustrated by machine 10. A representative client machine includes a browser 16, a known software tool used to access the servers of the network. The Web server supports files (collectively referred to as a "Web" site) in the form of hypertext documents and objects. In the Internet paradigm, a network path to a server is identified by a so-called Uniform Resource Locator (URL).

A representative Web server 12 is an IBM Netfinity server comprising a RISC-based processor 18, the AIX® operating system 20 and a Web server program 22, such as Netscape Enterprise Server. The server 12 also includes a display 24 supporting a graphical user interface (GUI) for management and administration, and an Application Programming Interface (API) 23 that provides extensions to enable application developers to extend and/or customize the core functionality thereof through software programs including Common Gateway Interface (CGI) programs, plug-ins, servlets, active server pages, server side include (SSI) functions or the like.

As seen in FIG. 1, a representative Web client machine 10 is a personal computer that includes a x86-, PowerPC®- or RISC-based processor 11, an operating system 13, such as IBM® OS/2® or Microsoft Windows '95, and the Web browser 16, such as Netscape Navigator 4.0 (or higher). The computer includes appropriate communication devices and software for connecting the machine to the computer network. Browser 16 typically has a Java Virtual Machine (JVM) and support for application plug-ins or helper applications. The client machine also includes a microphone 15 for receiving a user's spoken input, a voice recognition application 17 for recognizing spoken commands and input, and a voice-over-IP routine 19 for applying the voice input to an Internet Protocol (IP) packet stream. The computer also includes a speaker 21, a sound card 23 and associated audio support. A convenient voice recognition application 17 is ViaVoice™ available from IBM. The output of routine 19 is a voice-over-IP stream. Although voice-over-IP is the preferred protocol for transmitting the voice signals, any convenient protocol for transmitting voice signals on a network connection may be used.

As is well known, the Web server accepts a client request and returns a response. The operation of the server program 22 is governed by a number of server application functions (SAFs), each of which is configured to execute in a certain step of a sequence. This sequence, illustrated in FIG. 2 by way of background only, begins with authorization translation (AuthTrans) 30, during which the server translates any authorization information sent by the client into a user and a group. If necessary, the AuthTrans step may decode a message to get the actual client request. At step 32, called name translation (NameTrans), the URL associated with the request may be kept intact or it can be translated into a system-dependent file name, a redirection URL or a mirror site URL. At step 34, called path checks (PathCheck), the server performs various tests on the resulting path to ensure that the given client may retrieve the document. At step 36, sometimes referred to as object types (ObjectType), MIME (Multipurpose Internet Mail Extension) type information (e.g., text/html, image/gif, etc.) for the given document is identified. At step 38, called Service (Service), the Web server routine selects an internal server function to send the result back to the client. This function can run the normal server service routine (to return a file), some other server function (such as a program to return a custom document) or a CGI program. At step 40, called Add Log (AddLog), information about the transaction is recorded.

FIG. 3 illustrates a conventional Internet operating environment wherein client machines 42 connect to the Internet via an Internet service provider (ISP) 44. Internet service provider 44 provides Internet access to the users for a monthly, yearly or usage-based service fee. Thus, for example, a typical Internet service provider charges a given amount a month to provide a user of a client machine 42 unlimited Internet access. According to the invention, a client machine user is provided an option to make an IP telephony call to a live operator, typically located at (or otherwise associated with) a Web site to which the user is connected, and to have the charges for the telephone call invoiced by the ISP (or some third party on the ISP's behalf). Thus, when a user elects to contact a live operator during a browsing session, the charge for the call preferably shows up on the user's ISP billing statement. This service obviates use of a dedicated telephone line or specialized equipment for connecting the user to the live operator. As a result, the user may contact the live operator without terminating his or her existing Internet connection and Web browsing session.

Referring now to FIG. 4, a more fully provisioned service according to the invention comprises a set of client machines 42 that access the Internet through the ISP1 44 that is provisioned to provide the call processing service. ISP2 provides a similar service to its associated set of client machines 43. Web sites that have live operators associated therewith are designated by reference numeral 46. A live operator need not be located at the site itself, rather, the operator may be located wherever an appropriate telephone connection can be established. As can be seen, for convenience of discussion, each such Web site 46 is identified as a "900" Web site (as in a 900 telephone number) because the user accesses the site to speak with the live operator and, preferably, the charges for the call are billed to the user's ISP's account. A "900" Web site may be identified to the user of the client machine by having a given "telephone" icon or other graphic device on one or more pages. The icon is selected to initiate the IP telephony call to the live operator. Alternatively, a user may set up his or her own Internet telephone book in the browser to associate a given telephone number with a given link. Thus, clicking on a particular link invokes a corresponding call to the telephone book entry.

According to the invention, a telephone call to the Web site live operator is initiated from the client machine through a voice-over-IP connection originating from the client to the computer network. This connection is sometimes referred to herein as an IP telephony call. Typically, the user of the client machine initiates the IP telephony call by activating the telephone icon on a Web page. The client machine then accesses the Web site through a direct IP telephony connection (over the network) between the client and the site or, alternatively, through an intermediate server 45. The intermediate server 45 is used, for example, in the situation where the Web site is not capable of receiving IP telephony calls.

As seen in FIG. 4, the intermediate server 45 typically includes a switch 47 and a set of analog voice modems 49 that connect to the conventional telephone network. The server 45 also includes control routine 51 for controlling the switch 47 to route a given IP telephony call received at the server (from the computer network) to an appropriate destination station in the telephone network where the live operator is located. In operation, a given IP telephony call received at the server 45 comprises a voice-over-IP stream. Each packet in the stream includes information identifying the client machine and the destination number for the Web site. After routing through the switch, the IP telephony call is converted to analog form in the voice, modem 49 and output over the telephone network. Preferably, the intermediate server is located as close as possible to the called Web site so that the connection from the server is effected over conventional POTS service. If this not possible, the output of the voice modem is directed to a conventional interexchange carrier for servicing. With a set of voice modems, the intermediate server routes a plurality of incoming IP telephony calls from a plurality of client machines. Intermediate server 45 also may include other known telephone routing control methods, e.g., least cost routing, credit card billing, and the like. One of ordinary skill will appreciate that a plurality of servers 45 may, in turn, be controlled-by an management server.

As can be seen in FIG. 4, the plurality of provisioned Web sites are also managed by one or more account servers 48. The illustrated account server 48 preferably manages a plurality of ISPs and their associated users. Thus, for example, account server 48 stores in a database information identifying each ISP and the set of IP addresses associated therewith. Each IP address corresponds to the IP address of an ISP user provisioned to use the service.

Thus, when a user contracts for his or her Internet service, ISP 44 (if provisioned) offers the "one click" telephony service as an incidental "900-type" service. The "900" nomenclature is used for illustrative purposes, and is not to be taken by way of limitation. Typically, the user determines whether he or she desires to accept the service and, if so, whether given limitations are to be placed on the service. Thus, for example, the user may be provided with the option of restricting the number of allowable transactions, perhaps on a per day or per hour basis, or the option of restricting access to the service by certain individuals in the household (e.g., children), by class of service (e.g., based on a self-supplied or third party-supplied rating), or any other such desired restriction.

Although not by way of limitation, provisioned Web sites 46 typically provide access to live operators for any of a number of reasons, e.g., to facilitate an electronic commerce transaction, to answer questions about a product or an order, to provide other customer service assistance, or the like. According to the invention, the cost of the IP telephony call itself (if any), or the cost to access the live operator (which may be established by the site), or both, is charged to the user's ISP account. Thus, in an illustrative example; assume that the client machine can make the IP telephony call directly to the Web site. In this case, a relatively small value (e.g., $0.25) is charged to the user. Where the intermediate server is required, an additional charge (e.g., $0.25) is charged to convert the IP telephony call to a normal voice call over the network. These small value, repetitive transaction costs are then added to the user's ISP account. Alternatively, the user may be billed directly. The telephone network charges, if any, are billed in the usual manner.

In the preferred embodiment, the user is charged a small usage fee for the IP telephony call to the live operator, but such access to the operator is provided without requiring the user to fill out a lengthy credit card form and/or the submission of other such private information. The service also obviates establishment of a user debit account. An ISP may elect to provide highly-discounted or perhaps free Internet service to its subscribers if sufficient 900-type calling revenues are generated for the ISP.

Although the present invention has been illustrated for use with relatively small valued transactions, this is not a limitation of the present invention. There is no limit as to the amount of the given charge.

Each of the provisioned devices of the inventive system (e.g., ISP 44, intermediate server 45, Web site 46 and, optionally, account server 48) may use a encryption system 50 to secure communications across the service. One exemplary encryption system is based on a public key cryptography (PKC) scheme that is implemented in software. A public key system is useful in providing secure point-to-point communications between the various devices. One of ordinary skill in the art will also appreciate that other techniques may be used to secure this communication channel (such as a private key cryptosystem using a session key, or the like). Alternatively, communications between the devices may not be secured by dedicated encryption software (which, for example, may be the case where the portion of the network is already secure or security is not required). In the preferred embodiment, however, a PKC scheme is used as the software is readily available and easy to use. A representative software PKC product is known in the art as PGP (Pretty Good Privacy), which is available for download over the Internet.

As is well-known, a public key cryptosystem enables a pair of parties, each of whom have a public key and a private key "pair", to send and receive messages in a secure fashion. In particular, the sender can verify that only the recipient (and not some third party) gets the message, and the recipient can verify that the sender was the only party who could have sent the message. FIG. 5 illustrates the conventional private key cryptosystem operation. It is assumed that the sender (the first party) desires to send a given message to the recipient (the second party). As used herein, the sender or recipient may be a person, a device, a computer, a computer program, or some process or function. At step 60, the sender applies his private key to the message. At step 62, the sender applies the recipient's public key to the result of step 60. The resulting string is then sent to the recipient at step 64. At step 66, the recipient applies her private key to the received string. Thereafter, at step 68, the recipient decrypts the result by applying the sender's public key to obtain the message. Thus, a known public key cryptosystem of this type facilitates point-to-point secure communications between sender and recipient.

FIG. 6 is a flowchart illustrating a representative 900-type transaction according to the present invention. The routine begins at step 70 with the user accessing a Web site 46 having a live operator associated therewith. This is typically accomplished by having the user enter a URL in his or her Web browser or by accessing and selecting a previously-stored book mark entry. At step 71, the site presents a Web page, preferably with a "telephone icon" as previously described. A test is then performed at step 72 to determine if the user has selected the icon to initiate a telephone call to the live operator during the browsing session. If not, the routine terminates. If, however, the user has selected the telephone icon (or has otherwise indicated his or her desire to initiate live help), the routine continues at step 73. Using a client-side script, for example, a call request is then sent to the client's ISP. Preferably, the request consists of the user's address, the identity of the provisioned site, a cost amount, a called party identifier (e.g., an IP address or a telephone number), and a timestamp. The routine then continues at step 75 with the ISP determining that the request came from a modem on which the client logged onto the Internet service. At step 76, the ISP flags the user id (that logged onto the ISP service) as the user to be charged for the call. At step 77, the ISP checks (using information in its database) to see if all preferences and rules are being followed for this request (e.g., limit on $ spent per unit of time, category of service (looked up by using the site and service to be delivered fields from the request), limit on total $ to be spent, limit on amount per transaction, or any other rule). If the result of the test at step 77 indicates a given rule is violated, the routine branches to step 78 wherein the user is notified and the call does not proceed.

Following a positive outcome to the test at step 77, the ISP adds to the request: a current IP address for the user, the ISP's 900 account information, optionally a given userid, a timestamp and a transaction id. This is step 79. The ISP also may record such information for reconciliation purposes. At step 80, the ISP sends the augmented request to the 900 account server using a PKC scheme as previously described. At step 81, the account server verifies the ISP account and the site account. At step 82, the request is logged and forwarded to the site (using a PKC scheme) to indicate that the call may proceed. At step 84, the voice-over-IP telephony call is then connected in the manner previously described.

Although not shown in detail, at prescribed intervals, the 900 account server transfer appropriate charged amounts of money between the serviced ISPs and provisioned sites. Established EFT methods may be used for this purpose. Thus, for example, at the end of the account billing cycle, the ISP collects the charge from the user and sends the payment to the account server or other central clearinghouse. The revenues and profits are then allocated to the players according to the business model employed.

The ISP may elect to reduce the user's Internet access charge if the user takes advantage of the calling service to some given extent. Thus, for example, the ISP may reduce the user's access charge in an amount proportional to the number of calls made by the user through the service.

The present invention enables the user of a client machine to make a voice-over-IP telephony call to a Web site operator without having to disconnect a current browsing session. A small value charge is then added to the user's ISP bill. Web sites provisioned to provide this novel calling service identify themselves with an icon or other graphic device. Sites may participate in a revenue share arrangement with the ISP according to any convenient business model.

The inventive functionality includes a client side piece that facilitates the voice-over-IP telephony call. This functionality may be implemented as part of the browser, as a browser plug-in, an applet, a script, or any other convenient function. During the telephone call, the user's spoken input is recognized by the voice recognition application and applied to an IP packet stream (or other convenient protocol mechanism). The client side piece also communicates with the ISP in the manner previously described to initiate the charging transaction. The invention also preferably includes a "ISP" piece and a "Web server" piece to facilitate completion of the charging transaction in the manner previously described.

The above-described functions typically are implemented in software executable in a processor, namely, as a set of instructions (program code) in a code module resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

Further, as used herein, a Web "client" should be broadly construed to mean any computer or component thereof directly or indirectly connected or connectable in any known or later-developed manner to a computer network, such as the Internet. The term Web "server" should also be broadly construed to mean a computer, computer platform, an adjunct to a computer or platform, or any component thereof. Of course, a "client" should be broadly construed to mean one who requests or gets the file, and "server" is the entity which downloads the file. Likewise, "ISP" should be broadly construed to cover any system (including ISPs, OLSPs such as AOL or CompuServe, or any other public or private network services provider) to which users may connect to receive online services or transmissions.

Having thus described my invention, what I claim as new and desire to secure by letters patent is set forth in the

What is claimed is:

1. An Internet browsing method, comprising the steps of:
connecting a user of a client machine to a given server;
receiving a request to make an Internet Protocol (IP) telephony call from the client machine to a called party;
receiving restriction information for the user, wherein the restriction information identifies at least one call restriction;
determining whether the IP telephony call is restricted based on the restriction information;
responsive to the IP telephony call not being restricted, without disconnecting the client machine from the given server, initiating the IP telephony call; and
charging the user's service provider account a given fee.

2. The method as described in claim 1 wherein the called party is a live operator at the given server.

3. The method as described in claim 2 wherein the IP telephony call is a voice-over-IP call between the client machine and the live operator.

4. The method as described in claim 2 wherein the IP telephony call is a voice-over-IP call between the client machine and an intermediate server.

5. The method as described in claim 4 further including the step of initiating a telephone call between the intermediate server and the live operator.

6. The method as described in claim 1 wherein the step of receiving a request includes receiving a selection of an icon on a page being displayed at the client machine.

7. The method as described in claim 1 wherein the step of receiving a request includes receiving an activation of a link on a page being displayed at the client machine.

8. The method as described in claim 7 wherein the link is associated with the called party destination.

9. The method as described in claim 1 wherein the charging step comprises:

transmitting an authorization message to the service provider.

10. A browsing method, comprising the steps of:

connecting a user at a client machine to a given Web site;

receiving a request from the user to initiate a call to a live operator;

receiving restriction information for the user, wherein the restriction information identifies at least one call restriction;

determining whether the call is restricted based on the restriction information;

if the call is not restricted, initiating an IP telephony call from the user to the live operator without disconnecting the client machine from the given Web site; and charging the IP telephony call to the user's service provider account.

11. The browsing method as described in claim 10 wherein the step of receiving a request includes receiving an activation of a given element on a Web page served from the given Web site.

12. The browsing method as described in claim 10 wherein the given element is an icon representing that the given Web site has a live operator associated therewith.

13. The browsing method as described in claim 10 wherein the IP telephony call is a voice-over-IP call between the client machine and the live operator.

14. The method as described in claim 10 wherein the IP telephony call is a voice-over-IP call between the client machine and an intermediate server.

15. The method as described in claim 14 further including the step of initiating a telephone call between the intermediate server and the live operator.

16. A computer connectable to a computer network having a network service provider, the network service provider providing network access to a set of client machines, each user of a client machine having an account with the network service provider, comprising:

a processor;

a Web browser application; and an IP telephony calling application comprising:

means, responsive to a user request to initiate a call, for receiving restriction information for the user, wherein the restriction information identifies at least one call restriction;

means for determining whether the call is restricted based on the restriction information;

means, responsive to the call not being restricted, for initiating a voice-over-IP telephony call to a called party without interrupting a current browser connection; and means for issuing a transaction message to the network service provider that instructs the network service provider to charge the user a given amount for the voice-over-IP telephony call.

17. The computer as described in claim 16 further including a microphone, and a voice recognition application executing by the processor for converting spoken inputs to a voice signal.

18. A computer program product in a computer-readable medium for use in a client connectable to a computer network having a network service provider, the network service provider providing network access to a set of client machines, each user of a client machine having an account with the network service provider, the computer program product comprising:

means responsive to a user request to initiate a call, for receiving restriction information for the user, wherein the restriction information identifies at least one call restriction;

means for determining whether the call is restricted based on the restriction information;

means, responsive to the call not being restricted, for initiating a voice-over-IP telephony call to a called party without interrupting a current browser connection; and means for issuing a transaction message to the network service provider that instructs the network service provider to charge the user a given amount for the voice-over-IP telephony call.

19. The method of claim 1, wherein the at least one call restriction includes at lease one of a spending limit per unit of time, a total spending limit, and a limit on amount per transaction.

20. The method of claim 7, wherein the page is an address book page.

* * * * *